US012771273B2

(12) United States Patent
Wang

(10) Patent No.: US 12,771,273 B2
(45) Date of Patent: Oct. 20, 2026

(54) SYSTEM AND METHOD FOR CONTROLLING A PERMANENT MAGNET SYNCHRONOUS MOTOR TO OPTIMALLY TRACK A REFERENCE TORQUE

(71) Applicant: Mitsubishi Electric Research Laboratories, Inc., Cambridge, MA (US)

(72) Inventor: Yebin Wang, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 249 days.

(21) Appl. No.: 17/938,710

(22) Filed: Oct. 7, 2022

(65) Prior Publication Data

US 2024/0136963 A1 Apr. 25, 2024

(51) Int. Cl.

*H02P 25/022* (2016.01)
*H02P 6/08* (2016.01)
*H02P 6/34* (2016.01)
*H02P 21/14* (2016.01)

(52) U.S. Cl.

CPC .............. *H02P 25/022* (2013.01); *H02P 6/08* (2013.01); *H02P 6/34* (2016.02); *H02P 21/14* (2013.01); *H02P 2207/05* (2013.01)

(58) Field of Classification Search

CPC .. H02P 25/022; H02P 6/34; H02P 6/08; H02P 21/14; H02P 2207/05

See application file for complete search history.

(56) References Cited

U.S. PATENT DOCUMENTS

| | | | | |
|---|---|---|---|---|
| 10,768,585 B2 | 9/2020 | Merl | | |
| 11,736,048 B1 * | 8/2023 | Pramod | B62D 5/0409 318/696 |
| 2021/0111661 A1 * | 4/2021 | Pramod | H02P 21/22 |
| 2022/0345056 A1 * | 10/2022 | Aoki | H02P 6/08 |
| 2023/0202554 A1 * | 6/2023 | Endo | B62D 5/0463 701/41 |

OTHER PUBLICATIONS

Francis, Bruce A. "The linear multivariable regulator problem." SIAM Journal on Control and Optimization 15, No. 3 (1977): 486-505.

Gao, Weinan, and Zhong-Ping Jiang. "Adaptive dynamic programming and adaptive optimal output regulation of linear systems." IEEE Transactions on Automatic Control 61, No. 12 (2016): 4164-4169.

* cited by examiner

*Primary Examiner* — Zoheb S Imtiaz
(74) *Attorney, Agent, or Firm* — Gene Vinokur

(57) ABSTRACT

The present disclosure discloses a system and a method for controlling a permanent magnet synchronous motor to optimally track a reference torque. The method comprises reformulating a model of the permanent magnet synchronous motor based on one or more unknown parameters of the model, and the reference torque, determining an initial feedback control policy and an initial feedforward control policy, based on priori knowledge of parameters of the reformulated model of the permanent magnet synchronous motor, and executing iteratively a gain tuning algorithm, until a termination condition is met, to determine an optimal feedback gain and an optimal feedforward gain. The method further comprises determining a control command based on the optimal feedback gain and the optimal feedforward gain, and controlling the permanent magnet synchronous motor based on the determined control command to optimally track the reference torque.

20 Claims, 10 Drawing Sheets

SYSTEM AND METHOD FOR CONTROLLING A PERMANENT MAGNET SYNCHRONOUS MOTOR TO OPTIMALLY TRACK A REFERENCE TORQUE

TECHNICAL FIELD

This present disclosure relates generally to electric motors, and more particularly to a system and a method for controlling a permanent magnet synchronous motor to optimally track a reference torque.

BACKGROUND

Permanent magnet synchronous motors are one of the types of AC synchronous motors, where a magnetic field excitation is provided by permanent magnets. The permanent magnet synchronous motors are efficient, fast, safe, and yield a high dynamic performance. Additionally, the permanent magnet synchronous motors have high torque density and specific power density. Due to such properties and/or advantages of the permanent magnet synchronous motors, the permanent magnetic synchronous motors are increasingly found in a wide range of application across factory automation and electrified transportation. Various applications demand distinctive emphasis and requirements on the permanent magnetic synchronous motors.

For instance, in industrial applications, the permanent magnetic synchronous motor is desired to be run in a torque control mode, where the permanent magnetic synchronous motor is required to track a reference torque irrespective of a rotor speed of the permanent magnetic synchronous motor. A torque controller can be provided for the permanent magnetic synchronous motor to track the reference torque. The torque controller generates a control command for the motor, such that an output torque of the permanent magnetic synchronous motor tracks the reference torque. However, the torque controller may not achieve optimal torque tracking performance, i.e., an output torque of the permanent magnetic synchronous motor doesn't optimally track the reference torque.

Therefore, there is a need for a system and a method for controlling the permanent magnet synchronous motor to optimally track the reference torque.

SUMMARY

It is an object of some embodiments to provide a system and a method for controlling a permanent magnet synchronous motor to optimally track a reference torque. The reference torque may be specified by a user based on an application of the permanent magnet synchronous motor. Hereinafter, the permanent magnet synchronous motor is referred to as 'motor'.

Some embodiments are based on the recognition that a torque controller for tracking the reference torque is typically model-based, i.e., the torque controller depends on a model of the motor that models dynamics of the motor. However, some parameters of the model of the motor are unknown. For example, resistance and inductance of the motor are unknown. In addition, the unknown model parameters may vary due to temperature change or aging process. Thus, the torque controller is required to be self-tunable to adapt to the varying unknown model parameters. To that end, it is an objective of some embodiments to provide a self-tune torque controller that can adapt to changes in the unknown model parameters.

Further, some embodiments are based on the recognition that the self-tune torque controller may adapt to the unknown model parameters and track the reference torque, however, such a tracking may not be optimal because there is none cost function involved during self-tuning process. To that end, some embodiments aim to provide a self-tune optimal torque controller that not only adapts to the unknown model parameters, but also achieves optimal torque tracking performance (i.e., an output torque of the motor optimally tracks the reference torque).

Some embodiments are based on the recognition that a torque controller suitable for adapting to the unknown model parameters and achieving optimal torque tracking performance, includes two control policies, namely, a feedforward control policy and a feedback control policy. In some embodiments, the feedforward control policy is parameterized by a feedforward gain U matrix, and the feedback control policy is parameterized by a feedback gain K matrix. As such, a feedforward control command is $u_e$=Uw, and a feedback control command is $\bar{u}=-K\bar{x}$, where $\bar{x}=x-Xw$, w is a pseudo torque reference, and X is solved from regulator equations. The feedforward control command and the feedback control command are summed into a control command and the motor may be controlled according to the control command. To that end, the self-tune optimal torque control problem is solved to determine an optimal feedforward gain and an optimal feedback gain.

According to an embodiment, the self-tune optimal torque control problem can be formulated as adaptive optimal linear output regulation problem (AOLORP). Further, the model of the motor is reformulated into a linear time-invariant (LTI) system/model to use the model of the motor for applying AOLORP. The LTI model of the motor includes the pseudo torque reference. The pseudo torque reference is derived based on the reference torque. In one embodiment, an adaptive dynamic programming (ADP)-based algorithm is used for solving AOLORP to determine the optimal feedforward gain and the optimal feedback gain. However, since the model parameters, such as the motor resistance and the motor inductance, are unknown, the ADP-based algorithm cannot be applied directly to solve AOLORP. To that end, some embodiments modify the ADP-based algorithm based on the unknown model parameters. Some embodiments are based on the realization that, though the ADP-based algorithm is modified based on the unknown model parameters, the modified ADP-based algorithm still may not solve the AOLORP, because a regression matrix involved in the process of solving feedback control policy and/or the feedforward control policy suffers from column rank deficiency. Consequently, the modified ADP-based algorithm fails to learn the optimal feedforward gain and/or the optimal feedback gain.

To mitigate such a problem, some embodiments provide a gain tuning algorithm (also referred to as a two-step method) to learn the optimal feedback gain and the optimal feedforward gain when the model parameters, such as the motor resistance and the motor inductance, are unknown. The gain tuning algorithm, requiring an additive perturbation signal injected into the pseudo torque reference in addition to conventional perturbation signal injected into control command, is iteratively executed, until a termination condition is met, to learn the optimal feedback gain and the optimal feedforward gain.

In an iteration of the gain tuning algorithm, at first, a perturbed control input is computed based on a current feedforward control policy, a current feedback control policy and a perturbation signal. The perturbed control input is applied to the motor to obtain a first feedback signal. The first feedback signal includes a current and/or a speed produced by the motor corresponding to the perturbed control input. Further, based on the first feedback signal, the pseudo torque reference, and the perturbed control input, the optimal feedback gain is learned. At the first iteration, the current feedforward control policy is also referred to as an initial feedforward control policy; and the current feedback control policy is also referred to as an initial feedback control policy. In an embodiment, the initial feedback control policy and the initial feedforward control policy are determined based on priori knowledge of parameters of the model of the motor. The current feedforward and feedback control policies are repetitively updated over iterations.

Further, a control input is computed based on the current feedforward control policy and the current feedback control policy. The motor is controlled based on the computed control input and a perturbed pseudo torque reference to obtain a second feedback signal. The second feedback signal includes a current and/or a speed produced by the motor corresponding to the computed control input. In an embodiment, the perturbed pseudo torque reference is the pseudo torque reference perturbed with an additive perturbation signal. Further, based on the second feedback signal, the perturbed pseudo torque reference and the control input, the optimal feedforward gain is learned.

Once the optimal feedback gain and the optimal feedforward gain are obtained, a feedback control command and a feedforward control command are determined based on the optimal feedback gain and the optimal feedforward gain, respectively. Further, a control command is determined based on the feedback control command and the feedforward control command. Based on the determined control command, the motor is controlled to optimally track the reference torque.

Some embodiments are based on further realization that perturbing the pseudo torque reference with the additive perturbation signal and applying it together with the perturbed control input to simultaneously learn the optimal feedback gain and the optimal feedforward gain, is susceptible to numerical issues, because effects of both the perturbation in control and perturbation in the pseudo torque reference have similar impact on measured signals, and thus may render the regression matrix ill-conditioned.

Therefore, instead of simultaneously applying the perturbed control input and the perturbed pseudo torque reference to the motor, the perturbed control input and the perturbed pseudo torque reference are applied sequentially to the motor to learn the optimal feedback gain and the optimal feedforward gain sequentially. For instance, at first, the perturbed control input is applied to the motor to learn the optimal feedback gain the motor and, next, the perturbed pseudo torque reference is applied to the motor to learn the optimal feedforward gain.

Additionally or alternatively, in some embodiments, in addition to the resistance and the inductance of the motor, permanent magnet flux of the motor may be unknown. In such as a case, where the resistance, the inductance, and the permanent magnet flux of the motor are unknown, at first, the permanent magnet flux is determined by operating the motor at no-load condition and then the gain tuning algorithm is executed an optimal feedback control policy and an optimal feedforward control policy.

Accordingly, one embodiment discloses a controller for controlling a permanent magnet synchronous motor to optimally track a reference torque. The controller comprises: a processor; and a memory having instructions stored thereon that, when executed by the processor, cause the controller to: reformulate a model of the permanent magnet synchronous motor based on one or more unknown parameters of the model, and the reference torque, wherein the reformulated model includes a pseudo torque reference derived based on the reference torque; determine an initial feedback control policy and an initial feedforward control policy, based on priori knowledge of parameters of the reformulated model of the permanent magnet synchronous motor; execute iteratively a gain tuning algorithm, until a termination condition is met, to determine an optimal feedback gain and an optimal feedforward gain, wherein to execute an iteration of the gain tuning algorithm, the processor is configured to: control the permanent magnet synchronous motor based on a perturbed control input to obtain a first feedback signal, wherein the perturbed control input is based on the initial feedforward control policy, the initial feedback control policy and a perturbation signal; learn the optimal feedback gain based on the first feedback signal, the pseudo torque reference, and the perturbed control input; control the permanent magnet synchronous motor based on a control input and a perturbed pseudo torque reference, to obtain a second feedback signal, wherein the control input is based on the initial feedforward control policy and the initial feedback control policy; and wherein the perturbed pseudo torque reference corresponds to the pseudo torque reference perturbed with an additive perturbation signal; and learn the optimal feedforward gain based on the second feedback signal, the perturbed pseudo torque reference, and the control input; determine a feedback control command and a feedforward control command based on the optimal feedback gain and the optimal feedforward gain, respectively; determine a control command based on the feedback control command and the feedforward control command; and control the permanent magnet synchronous motor based on the determined control command to optimally track the reference torque.

Accordingly, another embodiment discloses a method for controlling a permanent magnet synchronous motor to optimally track a reference torque. The method comprises reformulating a model of the permanent magnet synchronous motor based on one or more unknown parameters of the model, and the reference torque, wherein the reformulated model includes a pseudo torque reference derived based on the reference torque; determining an initial feedback control policy and an initial feedforward control policy, based on priori knowledge of parameters of the reformulated model of the permanent magnet synchronous motor; executing iteratively a gain tuning algorithm, until a termination condition is met, to determine an optimal feedback gain and an optimal feedforward gain, wherein an iteration of the gain tuning algorithm comprises: controlling the permanent magnet synchronous motor based on a perturbed control input to obtain a first feedback signal, wherein the perturbed control input is based on the initial feedforward control policy, the initial feedback control policy and a perturbation signal; learning the optimal feedback gain based on the first feedback signal, the pseudo torque reference, and the perturbed control input; controlling the permanent magnet synchronous motor based on a control input and a perturbed pseudo torque reference, to obtain a second feedback signal, wherein the control input is based on the initial feedforward control policy and the initial feedback control policy; and wherein the perturbed pseudo torque reference corresponds to the pseudo torque reference perturbed with an additive perturbation signal; and learning the optimal feedforward gain based on the second feedback signal, the perturbed pseudo torque reference, and the control input; determining a feedback control command and a feedforward control command based on the optimal feedback gain and the optimal feedforward gain, respectively; determining a control command based on the feedback control command and the feedforward control command; and controlling the permanent magnet synchronous motor based on the determined control command to optimally track the reference torque.

Accordingly, yet another embodiment discloses a non-transitory computer-readable storage medium embodied thereon a program executable by a processor for performing a method for controlling a permanent magnet synchronous motor to optimally track a reference torque. The method comprises reformulating a model of the permanent magnet synchronous motor based on one or more unknown parameters of the model, and the reference torque, wherein the reformulated model includes a pseudo torque reference derived based on the reference torque; determining an initial feedback control policy and an initial feedforward control policy, based on priori knowledge of parameters of the reformulated model of the permanent magnet synchronous motor; executing iteratively a gain tuning algorithm, until a termination condition is met, to determine an optimal feedback gain and an optimal feedforward gain, wherein an iteration of the gain tuning algorithm comprises: controlling the permanent magnet synchronous motor based on a perturbed control input to obtain a first feedback signal, wherein the perturbed control input is based on the initial feedforward control policy, the initial feedback control policy and a perturbation signal; learning the optimal feedback gain based on the first feedback signal, the pseudo torque reference, and the perturbed control input; controlling the permanent magnet synchronous motor based on a control input and a perturbed pseudo torque reference, to obtain a second feedback signal, wherein the control input is based on the initial feedforward control policy and the initial feedback control policy; and wherein the perturbed pseudo torque reference corresponds to the pseudo torque reference perturbed with an additive perturbation signal; and learning the optimal feedforward gain based on the second feedback signal, the perturbed pseudo torque reference, and the control input; determining a feedback control command and a feedforward control command based on the optimal feedback gain and the optimal feedforward gain, respectively; determining a control command based on the feedback control command and the feedforward control command; and controlling the permanent magnet synchronous motor based on the determined control command to optimally track the reference torque.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

As used in this specification and claims, the terms "for example," "for instance," and "such as," and the verbs "comprising," "having," "including," and their other verb forms, when used in conjunction with a listing of one or more components or other items, are each to be construed as open ended, meaning that that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

Figure 1A:
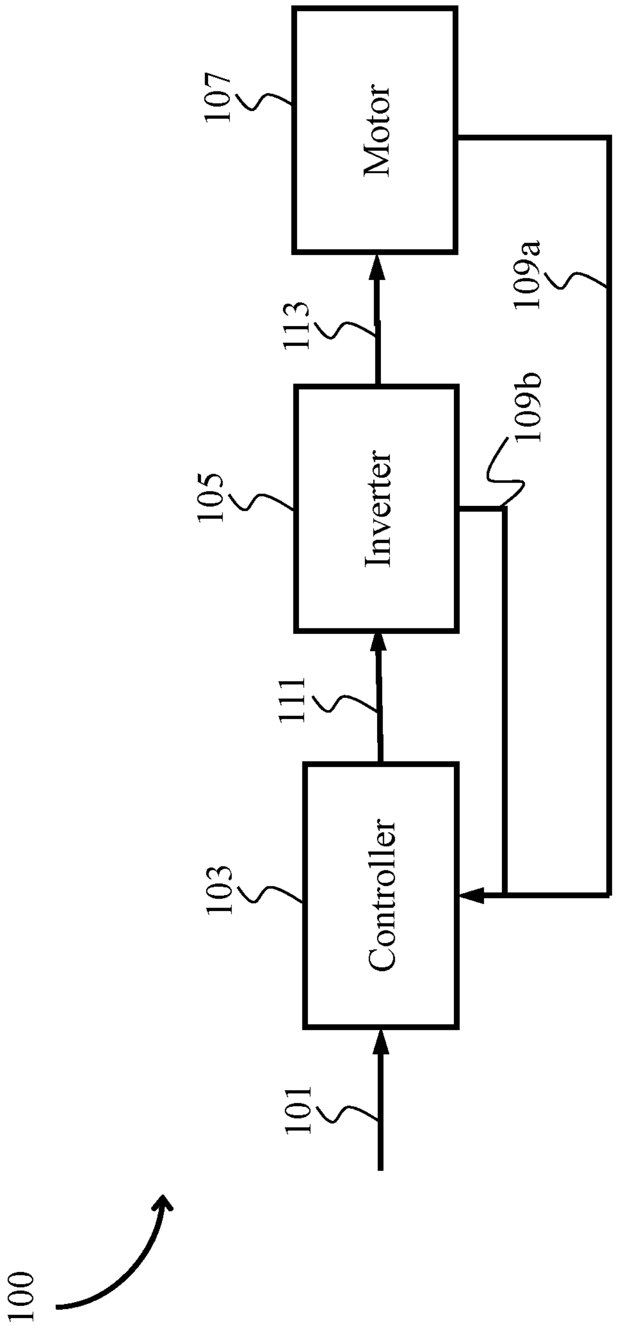
FIG. 1A shows a schematic for controlling of a permanent magnet synchronous motor, according to an embodiment of the present disclosure.

FIG. 1A shows a schematic 100 for controlling of a permanent magnet synchronous motor, according to an embodiment of the present disclosure. A controller 103 is connected to a permanent magnet synchronous motor 107 via an inverter 105. Hereinafter, the permanent magnet synchronous motor is referred to as 'motor'. At each time instant, a sensor signal 109*a* from sensors on the motor 107, and a sensor signal 109*b* from the inverter 105 are fed, together with a reference signal 101, into the controller 105. The controller 105 determines control commands 111 based on the sensor signal 109*a*, the sensor signal 109*b*, and the reference signal 101. The determined control commands 111 are applied to the inverter 105. The inverter 105 further generates voltages 113 to the motor 107 based on the control commands 111.

In some embodiments, the sensor signal 109*a* includes a position of the motor's rotor, which also implies a speed of the motor's rotor. The sensor signal 109*b* includes three-phase currents flowing through the motor 107. The sensor signal 109*a* and the sensor signal 109*b* together referred to as a feedback signal. In some embodiments, the inverter 105 is implemented by a voltage source inverter which takes AC power as input and outputs three-phase balanced sinusoidal voltages 113. As such the control commands 111 also indicates desired three-phase balanced sinusoidal voltages, where each phase voltage is determined by its amplitude and phase angle.

In some embodiments, dynamics of the motor 107 are modeled as a system of ordinary differential equations which admit the following state space representation $$\begin{aligned} \dot{i}_d &= -\gamma i_d + p\Omega i_q + \frac{u_d}{L_s} \\ \dot{i}_q &= -\gamma i_q - p\Omega\left(i_d + \frac{\phi_{pm}}{L_s}\right) + \frac{u_q}{L_s}, \\ J\dot{\Omega} &= \frac{3p}{2}(L_s i_d + \phi_{pm})i_q - T_L \\ y &= [i_d, i_q, \Omega]^\top \end{aligned} \tag{1}$$

where $u_d$, $u_q$ are control input, $i_d$ is used to adjust rotor flux $\phi_d$ which can be written as $\phi_d = L_s i_d + \phi_{pm}$; and $i_q$ corresponds to a torque that motor 107 produces, given by $T_e = 3p\phi_d i_q/2$. Currents $i_d$, $i_q$ can be controlled by voltages $u_d$ and $u_q$, respectively, and thus $\phi_d$ and $T_e$ can be regulated independently.

In some embodiments, $\phi_{pm}$ is a desired rotor flux for torque generation, and thus a reference flux $$\phi_d^* = \phi_{pm},$$

which implies a reference d-axis current is zero:

$$i_d^* = 0.$$

A rotor speed $\Omega$ is determined by external apparatus, and not a state variable anymore. Hence the model (1) is reduced to a set of order ordinary differential equations representing the dynamics of $i_d$ and $i_q$:

$$\begin{aligned} \dot{i}_d &= -\gamma i_d + p\Omega i_q + \frac{u_d}{L_s} \\ \dot{i}_q &= -\gamma i_q - p\Omega\left(i_d + \frac{\phi_{pm}}{L_s}\right) + \frac{u_q}{L_s}, \\ y &= [i_d, i_q]^\top \end{aligned} \tag{2}$$

where $\Omega$ is known.

In an embodiment, the controller 103 is configured to act as a torque controller, i.e., the controller 103 controls the motor 107 to track a reference torque. The reference torque may be specified by a user based on an application of the motor 107. Some embodiments are based on the recognition that the torque controller for tracking the reference torque is typically model-based, i.e., the torque controller depends on the model of the motor 107 that models the dynamics of the motor 107. However, some parameters of the model of the motor 107 are unknown. For example, resistance and inductance of the motor 107 are unknown. In addition, the unknown model parameters may vary due to temperature change or aging process. Thus, the torque controller is required to be self-tunable to adapt to the varying unknown model parameters. To that end, it is an objective of some embodiments to provide a self-tune torque controller that can adapt to changes in the unknown model parameters.

Further, some embodiments are based on the recognition that the self-tune torque controller may adapt to the unknown model parameters and track the reference torque, however, such a tracking may not be optimal because there is none cost function involved during self-tuning process. To that end, some embodiments aim to provide a self-tune optimal torque controller that not only adapts to the unknown model parameters, but also achieves optimal torque tracking performance (i.e., an output torque of the motor 107 optimally tracks the reference torque).

Figure 1B:
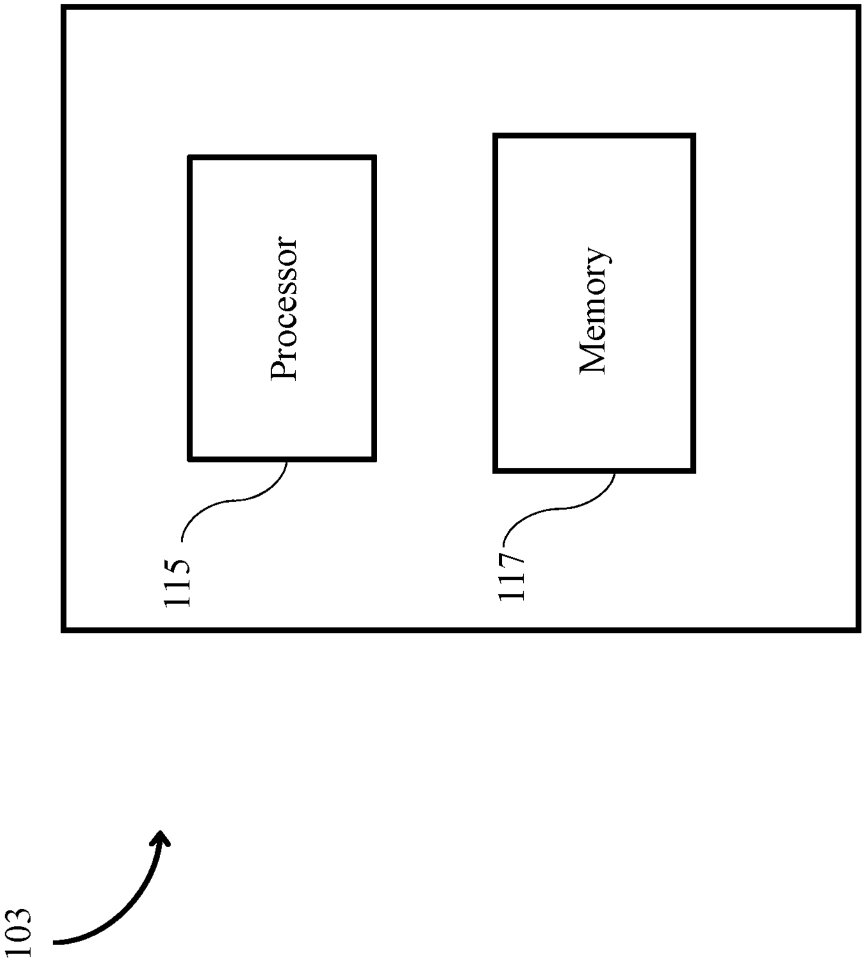
FIG. 1B shows a block diagram of a controller for controlling a permanent magnet synchronous motor to optimally track a reference torque, according to an embodiment of the present disclosure.

FIG. 1B shows a block diagram of the controller 103 configured as the self-tune optimal torque controller that not only adapts to the unknown model parameters, but also achieves optimal torque tracking performance, according to an embodiment of the present disclosure. The controller 103 includes a processor 115 and a memory 117. The processor 115 may be a single core processor, a multi-core processor, a computing cluster, or any number of other configurations. The memory 117 may include random access memory (RAM), read only memory (ROM), flash memory, or any other suitable memory systems. Additionally, in some embodiments, the memory 117 may be implemented using a hard drive, an optical drive, a thumb drive, an array of drives, or any combinations thereof.

Some embodiments are based on the recognition that the controller 103 for adapting to the unknown model parameters and achieving optimal torque tracking performance, includes two control policies, namely, a feedforward control policy and a feedback control policy. In some embodiments, the feedforward control policy is parameterized by a feedforward gain U (also referred to as feedforward gain matrix), and the feedback control policy is parameterized by a feedback gain K (also referred to as feedback gain matrix). As such, a feedforward control command is $u_e = Uw$, and a feedback control command is $\bar{u} = -K\bar{x}$, where $\bar{x} = x - Xw$, w is a pseudo torque reference, and X is solved from regulator equations. The feedforward control command and the feedback control command are summed into a control command and the motor 107 may be controlled according to the control command. To that end, the self-tune optimal torque control problem is solved to determine an optimal feedforward gain (U*) and an optimal feedback gain (K*).

According to an embodiment, the self-tune optimal torque control problem can be formulated as adaptive optimal linear output regulation problem (AOLORP). Further, the model of the motor 107 is reformulated into a linear time-invariant (LTI) system/model to use the model of the motor 107 for applying AOLORP. For example, the model of the motor 107 is reformulated into the following LTI model $$\dot{x} = Ax + Bu + Dw$$

$$e = Cx + Fw, \tag{3}$$

where $x \in \mathbb{R}^n$ is a system state, $u \in \mathbb{R}^m$ control input, $w \in \mathbb{R}^q$ a pseudo torque reference, and $e \in \mathbb{R}^r$. In an embodiment, $x = [i_d, i_q]^T$, $u = [u_d, u_q]^T$, w may be different depending on a combination of the unknown model parameters, and the tracking error given by:

$$e = \left[i_d, i_q - i_q^*\right]^\top.$$

The LTI model of the motor 107 includes the pseudo torque reference w. The pseudo torque reference may be derived based on the reference torque. It could include different signals, depending on the unknown model parameters. The feedforward gain U and the feedback gain K, implicitly depending on matrices U and X, satisfy the following regulator equations $$AX+BU+D=0$$

$$CX+F=0. \quad (4)$$

In one embodiment, an adaptive dynamic programming (ADP)-based algorithm is used for solving AOLORP to determine the optimal feedforward gain and the optimal feedback gain. However, since the model parameters, such as the motor resistance and the motor inductance, are unknown, the ADP-based algorithm cannot be applied directly to solve AOLORP. To that end, some embodiments modify the ADP-based algorithm based on the unknown model parameters. Some embodiments are based on the realization that, though the ADP-based algorithm is modified based on the unknown model parameters, the modified ADP-based algorithm still may not solve the AOLORP, because a regression matrix involved in the process of solving feedback control policy and/or the feedforward control policy suffers from column rank deficiency. Consequently, the modified ADP-based algorithm fails to learn the optimal feedforward gain and/or the optimal feedback gain.

To mitigate such a problem, some embodiments provide a gain tuning algorithm to learn the optimal feedback gain and the optimal feedforward gain when the model parameters, such as the motor resistance and the motor inductance, are unknown. The gain tuning algorithm is iteratively executed by the processor 115, until a termination condition is met, to learn the optimal feedback gain and the optimal feedforward gain. The gain tuning algorithm is explained below in FIG. 1C.

Figure 1C:
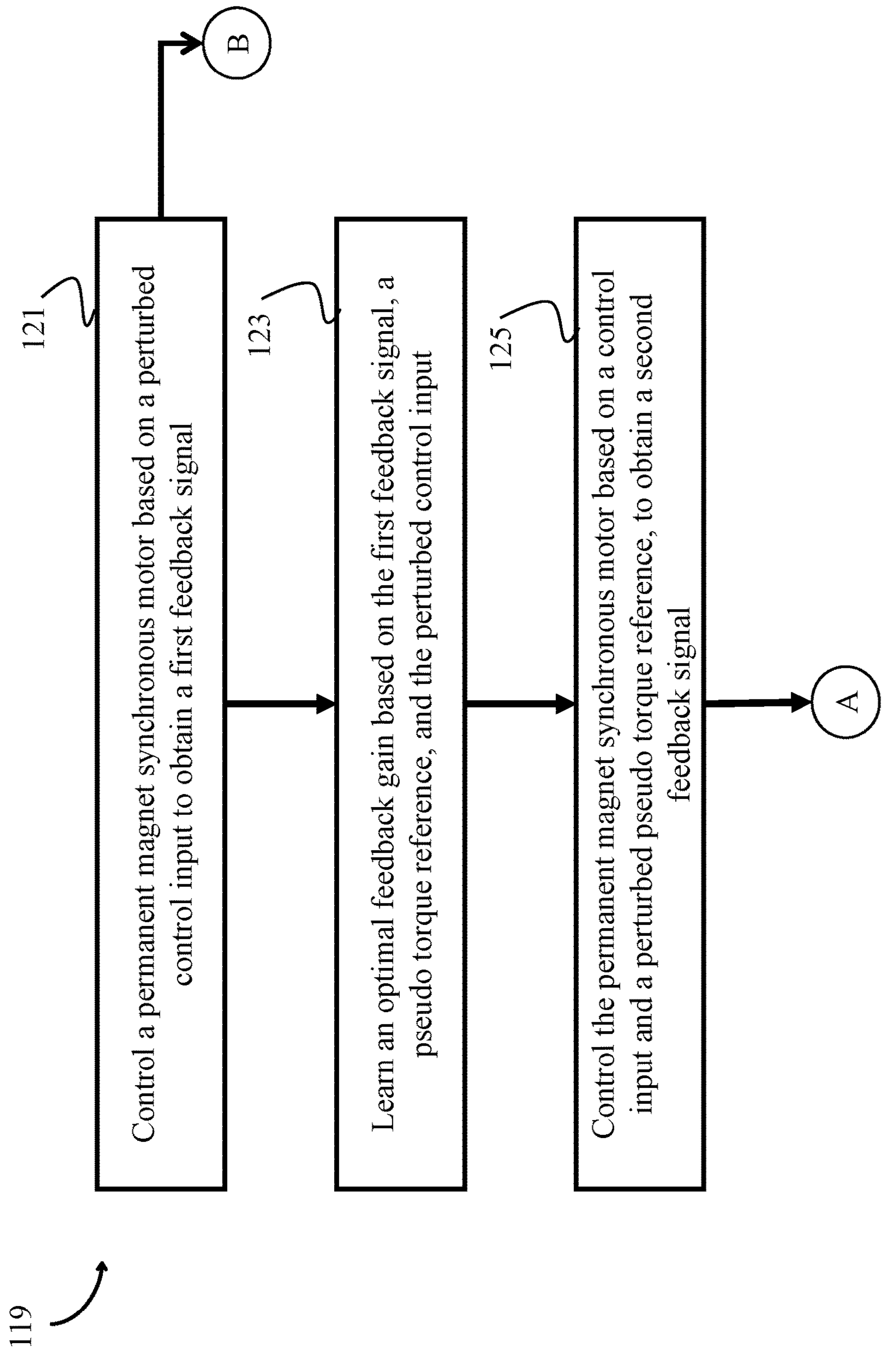
FIG. 1C shows a block diagram of a gain tuning algorithm for learning an optimal feedback gain and an optimal feedforward gain, according to an embodiment of the present disclosure.
Figure 1C:
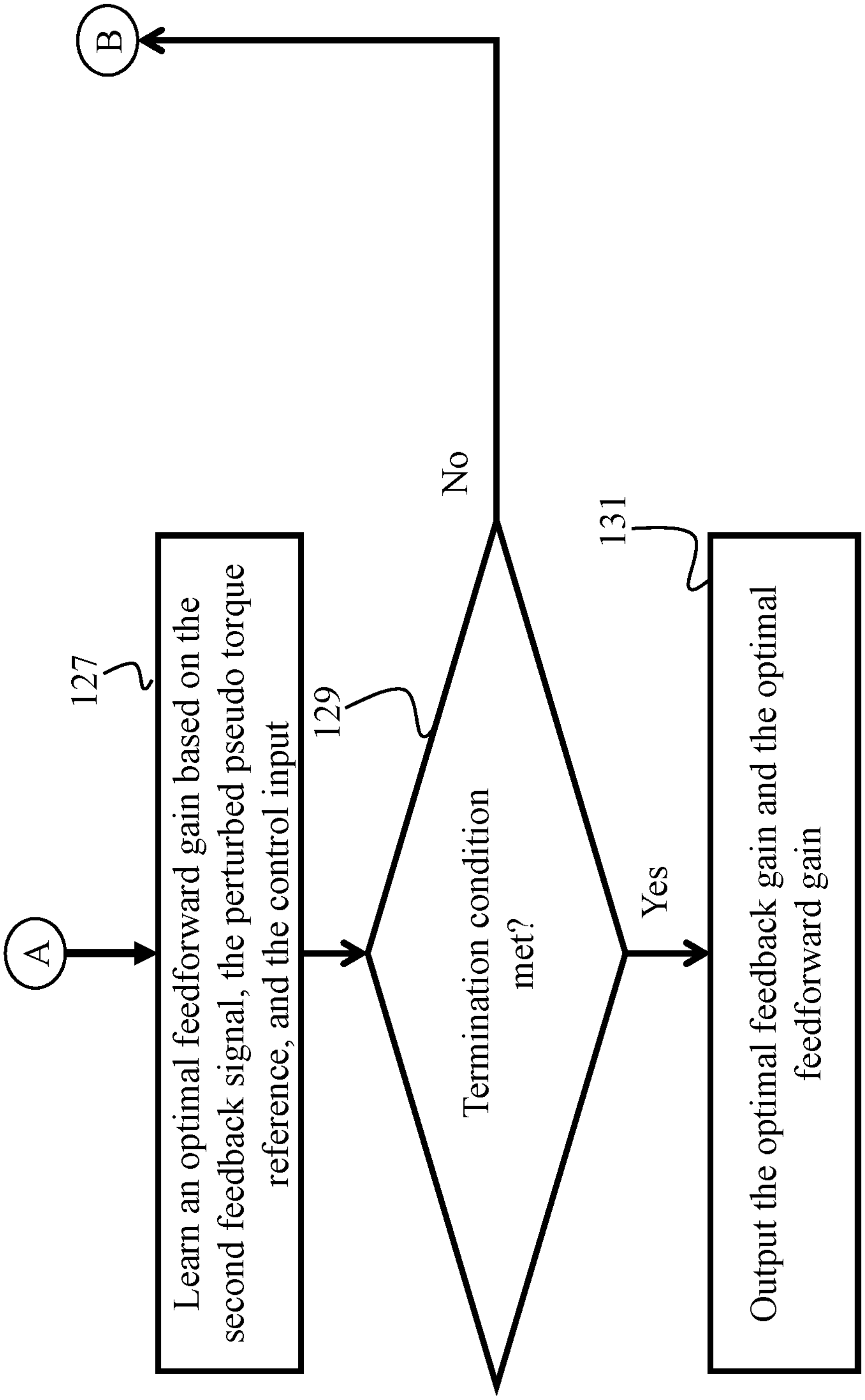

FIG. 1C shows a block diagram 119 of the gain tuning algorithm, according to an embodiment of the present disclosure. At block 121, the processor 115 controls the motor 107 based on a perturbed control input to obtain a first feedback signal. The first feedback signal includes a current and/or a speed produced by the motor 107 corresponding to the perturbed control input. In an embodiment, the perturbed control input u is computed based on a current feedforward control policy, a current feedback control policy, and a perturbation signal. For instance, the perturbed control input may be given by $u=u_{fb}+u_{ff}+\rho(t)$, where $u_{fb}$ is the current feedforward control policy, $u_{ff}$ is the current feedback control policy, and $\rho(t)$ is the perturbation signal.

The current feedforward and feedback control policies are repetitively updated over iterations. At the first iteration, the current feedforward control policy is also referred to as an initial feedforward control policy, and the current feedback control policy is also referred to as an initial feedback control policy. In an embodiment, the initial feedback control policy and the initial feedforward control policy may be given by $u_{fb}=-K_0\bar{x}$ and $u_{ff}=U_0w$, respectively, based on priori knowledge of parameters of the reformulated model (3) of the motor 107.

At block 123, the processor 115 learns the optimal feedback gain based on the first feedback signal, the pseudo torque reference, and the perturbed control input. The learning of the optimal feedback gain is explained in detail in FIG. 2.

At block 125, the processor 115 controls the motor 107 based on a control input and a perturbed pseudo torque reference to obtain a second feedback signal. The second feedback signal includes a current and/or a speed produced by the motor 107 corresponding to the control input. In an embodiment, the control input is computed based on the current feedforward control policy $u_{fb}$ and the current feedback control policy $u_{ff}$, as $u=u_{fb}+u_{ff}$. In an embodiment, the perturbed pseudo torque reference $\bar{w}$ is the pseudo torque reference w perturbed with an additive perturbation signal $w_d(t)$, i.e., $\bar{w}=w+w_d(t)$.

At block 127, the processor 115 learns the optimal feedforward gain based on the second feedback signal, the perturbed pseudo torque reference and the control input. The learning of the optimal feedforward gain is explained in detail in FIG. 3.

At block 129, the processor 115 checks if the termination condition is met. For example, the termination condition may correspond to a difference between the feedforward gain learned from the current iteration and a feedforward gain learned from the previous iteration is less than a threshold. If the termination condition is not met, then next iteration is executed. If the termination condition is met, then, at block 131, the optimal feedback gain and the optimal feedforward gain are outputted.

Figure 1D:
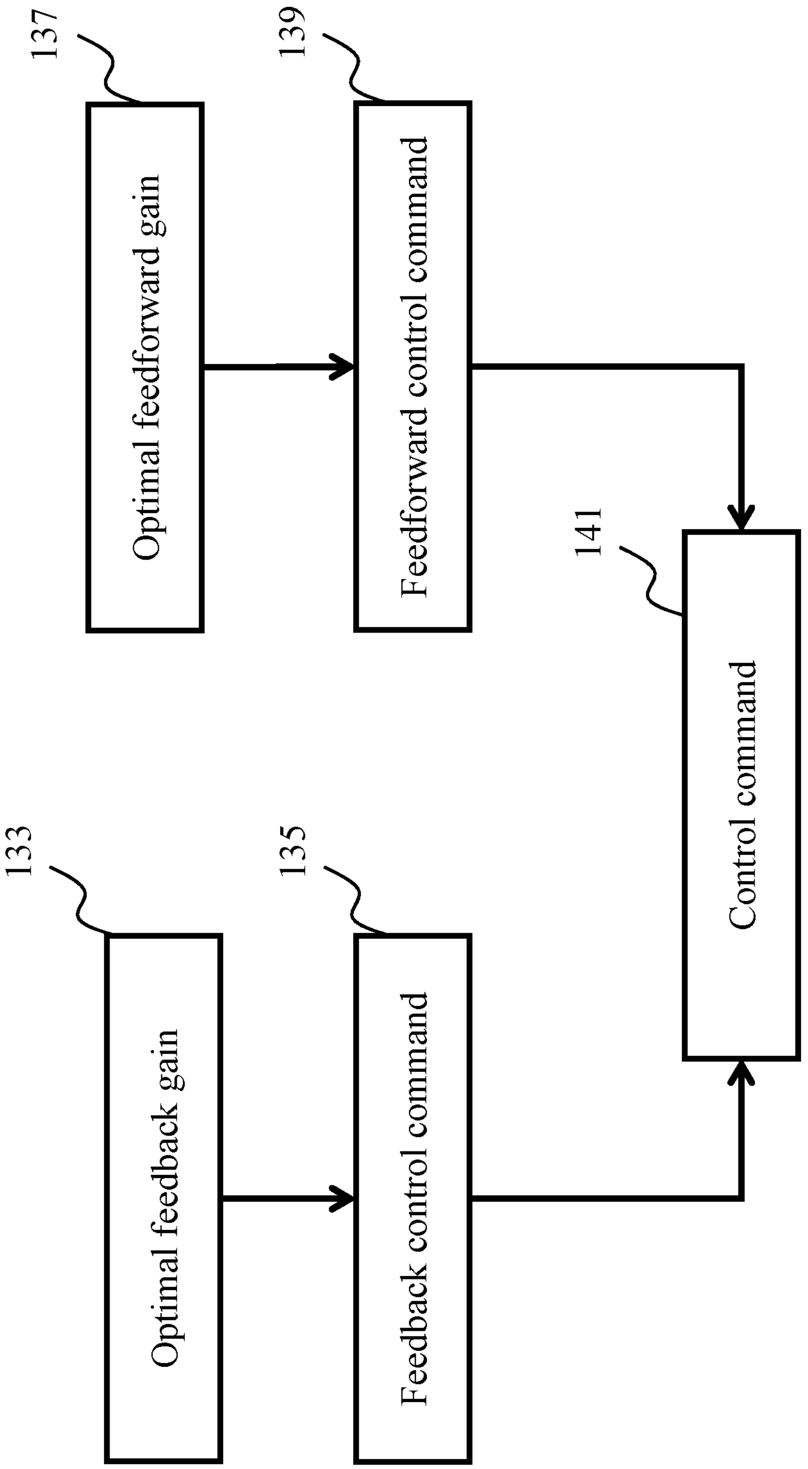
FIG. 1D shows a block diagram for determining a control command based on the optimal feedback gain and the optimal feedforward gain, according to an embodiment of the present disclosure.

Further, based on the optimal feedback gain and the optimal feedforward gain, the motor 107 may be controlled to optimally track the reference torque, as described below in FIG. 1D. For instance, the processor 115 determines a feedback control command 135 based on the optimal feedback gain 133, and a feedforward control command 139 based on the optimal feedforward gain 137. Further, the processor 115 determines a control command 141 based on the feedback control command 135 and the feedforward control command 130. Based on the determined control command, the processor 115 controls the motor 107 to optimally track the reference torque.

Some embodiments are based on further realization that perturbing the pseudo torque reference with the additive perturbation signal and applying it together with the perturbed control input to simultaneously learn the optimal feedback gain and the optimal feedforward gain, is susceptible to numerical issues, because effects of both the perturbation in the perturbed control input and perturbation in the pseudo torque reference have similar impact on measured signals (i.e., feedback signals), and thus may render the regression matrix ill-conditioned.

Therefore, in the gain tuning algorithm, instead of simultaneously applying the perturbed control input and the perturbed pseudo torque reference to the motor 107, the perturbed control input and the perturbed pseudo torque reference are applied sequentially to the motor 107 to learn the optimal feedback gain and the optimal feedforward gain sequentially. For instance, at first, the perturbed control input is applied to the motor 107 to learn the optimal feedback gain and, next, the control input and the perturbed pseudo torque reference are applied to the motor 107 to learn the optimal feedforward gain.

Figure 2:
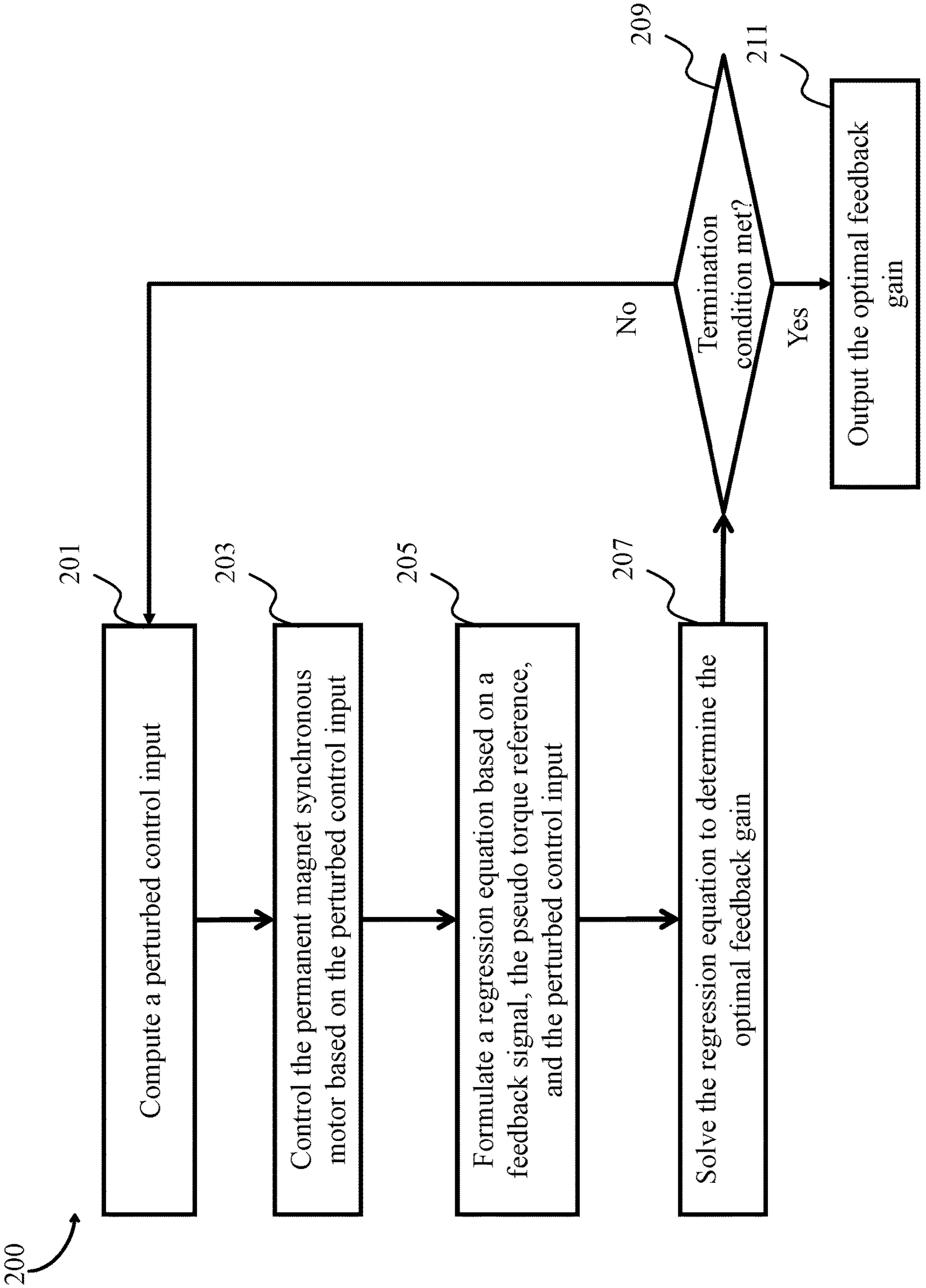
FIG. 2 shows a block diagram of a method for learning the optimal feedback gain, according to an embodiment of the present disclosure.

FIG. 2 shows a block diagram of a method 200 for learning the optimal feedback gain, according to an embodiment of the present disclosure. At block 201, the processor 115 computes a perturbed control input based on the current feedforward control policy, the current feedback control policy and the perturbation signal. At block 203, the processor 115 controls the motor 107 based on the perturbed control input to obtain a feedback signal. The feedback signal includes a current and/or a speed produced by the motor 107 corresponding to the computed perturbed control input.

At block 205, the processor 115 formulates a regression equation based on the feedback signal, the pseudo torque reference, and the computed perturbed control input. At block 207, the processor 115 solves the regression equation to determine the optimal feedback gain.

Further, at block 209, the processor 115 checks if a termination condition is met. For example, the termination condition may correspond to a difference between the feedback gain learned from the current iteration and a feedback gain learned from the previous iteration is less than a threshold. If the termination condition is not met, then next iteration is executed. If the termination condition is met, then, at block 211, the optimal feedback gain is outputted.

The formulation of the regression equation to determine the optimal feedback gain, is mathematically described below.

Some embodiments consider the $i_d$- and $i_q$-dynamics (2) and rearrange it in the form of (3) with $$A=\begin{bmatrix}-\gamma & p\Omega\\ -p\Omega & -\gamma\end{bmatrix},\ B=\frac{1}{L_s}I_2,\ C=I_2$$

$$D=\begin{bmatrix}0 & 0\\ \frac{1}{L_s} & 0\end{bmatrix},\ F=\begin{bmatrix}0 & 0\\ 0 & \frac{-2}{3p\phi_{pm}}\end{bmatrix},\ w=\begin{bmatrix}p\Omega\phi_{pm}\\ T_L^*\end{bmatrix}.$$

With $R_s$, $L_s$ unknown, matrices A, B, D are unknown, whereas matrices C, F are known. A unique solution of X: $X^*=-F$, which is implicitly optimal, can be solved. Further, the optimal feedback gain $U^*$ is to be solved with A, B, D being unknown. Since B is non-singular, the regulator equation admits a unique solution: $U^*=-L_s(AX+D)$, i.e., there is no freedom in designing the feedforward control policy to optimize performance. The regulation equation (4) can be rewritten below:

$$-(I_2\otimes B)\mathrm{vec}(U)=\mathrm{vec}(D+AX^*),\tag{5}$$

where B and the right hand side (RHS) may be obtained as a byproduct of solving an optimal state feedback control $\bar{u}=K^*\bar{x}$ using data-driven policy iteration (PI) algorithm.

According to an embodiment, the regression equation is constructed as follows: $\bar{x}=x-X^*w$ and its dynamics given by $$\dot{\bar{x}}=A\bar{x}+Bu+(AX^*+D)w$$

$$e=C\bar{x}.$$

If there exists a stabilizing state feedback control law $-K\bar{x}$ as a priori, then $$\dot{\bar{x}}=(A-BK)\bar{x}+B(u+K\bar{x})+(AX^*+D)w.\tag{6}$$

Given (6), the data-driven PI algorithm is employed to synthesize $K^*$, and determine B,vec(AX+D). The data-driven PI algorithm begins with an initial stabilizing feedback policy $v_0=K_0\bar{x}$, and a value function is parameterized as a positive definite quadratic function, i.e., $V(\bar{x})=\bar{x}^TP_j\bar{x}$ with $P_j>0$. At jth policy iteration, $P_j$, $K_{j+1}$ and vec(AX+D) are determined, given $v_j=K_j\bar{x}$.

Knowledge of $X^*$ simplifies the search for $K^*$. Specifically, the present disclosure constructs a regressor matrix based on dynamics of variable $\bar{x}=x-X^*w$ instead of a sequence of $\bar{x}_i=x-X_iw$, where $X_i$ is a basis of a solution space of CX+F=0. Hence an evaluation of a control policy $v_j$, i.e., solving the corresponding value function, along a trajectory of a resultant closed-loop system (6) over a time interval [t,t+δt], can be simplified as follows $$\bar{x}^\top(t+\delta t)P_j\bar{x}(t+\delta t)-\bar{x}^\top(t)P_j\bar{x}(t)=\int_t^{t+\delta t}\{\bar{x}^\top(A_j^\top P_j+P_jA_j)\bar{x}+$$

-continued $$2(u+K_j\bar{x})^\top B^\top P_j\bar{x}+$$
$$2w^\top(D+AX^*)^\top P_j\bar{x}\}d\tau$$
$$=-\int_t^{t+\delta t}\bar{x}^\top(Q+K_j^\top RK_j)\bar{x}d\tau+$$
$$\int_t^{t+\delta t}2(u+K_j\bar{x})^\top RK_{j+1}\bar{x}d\tau+$$
$$\int_t^{t+\delta t}2w^\top(D+AX^*)^\top P_j\bar{x}d\tau,$$

where the first term corresponds to cost related to feedback control, the second term is contributed by non-vanishing control, and the third term related to the exosignal. Vectorization of the aforementioned matrix equation gives the following linear equations from data over [t,t+δt]

$$[\psi_P(t)\psi_K(t)\psi_D(t)]\Theta=\psi_b(t)$$

where $$\psi_P(t)=\widehat{\mathrm{vecs}}(x(t+\delta t))-\widehat{\mathrm{vecs}}(x(t))$$
$$\psi_K(t)=-2\int_t^{t+\delta t}(\bar{x}^\top\otimes(u+K_j\bar{x})^\top)d\tau\times(I_n\otimes R)$$
$$\psi_D(t)=-2\int_t^{t+\delta t}(\bar{x}^\top\otimes w^\top)d\tau$$
$$\Theta=\begin{bmatrix}vecs(P_j)\\ vec(K_{j+1})\\ vec((D+AX^*)^\top P_j)\end{bmatrix}.$$
$$\psi_b(t)=-\int_t^{t+\delta t}\bar{x}^\top(Q+K_j^\top RK_j)\bar{x}d\tau$$

Here, for a vector $x=[x_1, \ldots, x_n]^T\in\mathbb{R}^n$, $$\widehat{\mathrm{vecs}}(x)=[x_1^2,\ldots,x_n^2,x_1x_2,\ldots,x_{n-1}x_n]^\top;$$

for a positive definite matrix $P\in\mathbb{R}^{n\times n}$, $vecs(P)=[P_{11}, \ldots, P_{nn}, 2P_{12}, \ldots, 2P_{n-1,n}]^T$; and for a matrix $T\in\mathbb{R}^{n\times m}$ $$vec(T)=[T_1^\top,\ldots,T_m^\top]^\top.$$

For self-tuning torque control, the aforementioned linear equations include eleven variables to solve, and thus requires collecting data over at least eleven time intervals. For instance, for N data collected $$\Psi\Theta=\Psi_b\tag{7}$$
$$\Psi=\begin{bmatrix}\psi_P(t_1) & \psi_K(t_1) & \psi_D(t_1)\\ \vdots & \vdots & \vdots\\ \psi_P(t_N) & \psi_K(t_N) & \psi_D(t_N)\end{bmatrix}.$$
$$\Psi_b=[\psi_b(t_1)\ \ldots\ \psi_b(T_N)]^\top$$

With Θ being solved, matrix B can be determined as:

$$B=(RK_{j+1}P_j^{-1})^\top.$$

With knowledge of (D+AX*), the optimal feedforward gain U* can be determined from (5).

Figure 3:
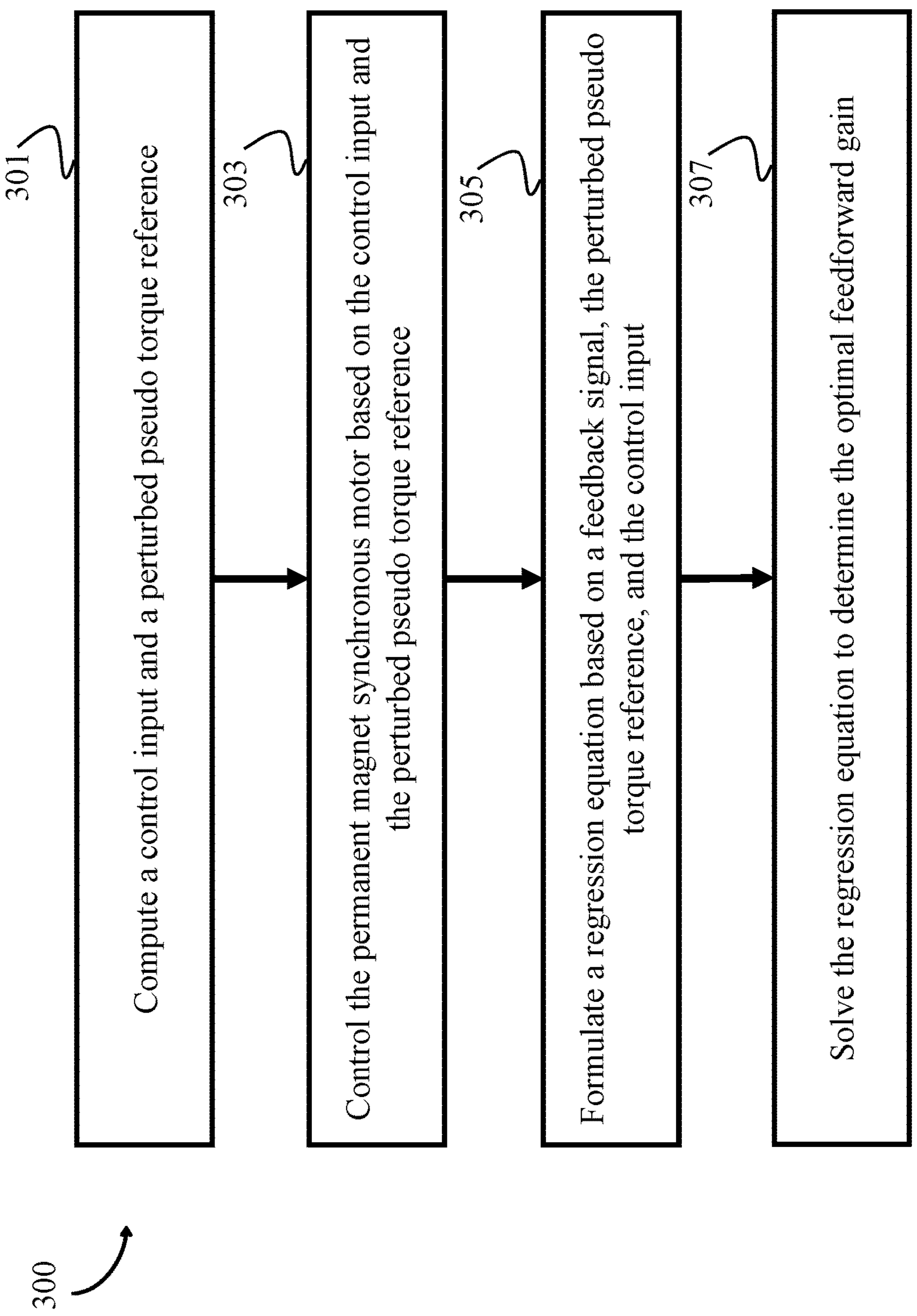
FIG. 3 shows a block diagram of a method for learning the optimal feedforward gain, according to an embodiment of the present disclosure.

FIG. 3 shows a block diagram of a method 300 for learning the optimal feedforward gain, according to an embodiment of the present disclosure. At block 301, the processor 115 computes a control input based on the current feedforward control policy and the current feedback control policy.

At block 303, the processor 115 controls the motor 107 based on the computed control input and the perturbed pseudo torque reference to obtain a feedback signal. The feedback signal includes a current and/or a speed produced by the motor 107 corresponding to the computed control input.

At block 305, the processor 115 formulates a regression equation based on the second feedback signal, the perturbed pseudo torque reference, and the computed control input. At block 307, the processor 115 solves the regression equation to determine the optimal feedforward gain.

To facilitate derivation of the gain-tuning algorithm, vectors of parameters are defined as $\Theta_1=[\mathrm{vecs}(P)^T,\mathrm{vec}(K)^T]^T$, and $\Theta_2=\mathrm{vec}((D+AX)^T P)$. Some embodiments are based on the realization that it is beneficial to learn the optimal feedback gain and the optimal feedforward gain sequentially to ensure the related parameters $\Theta_1$ and $\Theta_2$ can be identified exactly. This is crucial when the pseudo reference torque to be tracked is constant, where without perturbation, the parameters related to the feedforward gain matrix cannot be identified.

For $\psi_D$, $\bar{x}\otimes w=[\bar{x}_1 w, \ldots, \bar{x}_n w]$ and for the first q columns, $[\bar{x}_1 w_1, \ldots, \bar{x}_1 w_q]$. Hence, for N data points, the first q columns are rearranged as below $$\Psi_{D1}=\begin{bmatrix}\int_0^{\delta t}\bar{x}_1(\tau)w_1(\tau)d\tau & \ldots & \int_0^{\delta t}\bar{x}_1(\tau)w_q(\tau)d\tau\\ \vdots & \vdots & \vdots\\ \int_t^{t+\delta t}\bar{x}_1(\tau)w_1(\tau)d\tau & \ldots & \int_t^{t+\delta t}\bar{x}_1(\tau)w_q(\tau)d\tau\end{bmatrix}$$

If w is constant over $[0,t+\delta t]$, $\psi_{D1}$ has rank 1. Hence, $\Theta_2$ is not identifiable, and thus the feedforward gain matrix cannot be learned. The gain tuning algorithm solves for feedforward-related parameters, i.e., $\Theta_2$, from:

$$\psi_D(t)\Theta_2=\psi_b(t)-[\psi_P(t),\psi_K(t)]\Theta_1. \tag{8}$$

Additionally or alternatively, in some embodiments, in addition to the resistance and the inductance of the motor 107, permanent magnet flux $\phi_{pm}$ of the motor 107 may be unknown. The absence of the permanent magnet flux $\phi_{pm}$ means the previously defined F is unknown. Matrices D, F and exogenous signal w have the following expressions $$D=\begin{bmatrix}0 & 0\\ \frac{\phi_{pm}}{L_s} & 0\end{bmatrix},\ F=\begin{bmatrix}0 & 0\\ 0 & \frac{-2}{3p\phi_{pm}}\end{bmatrix},\ w=\begin{bmatrix}p\Omega\\ T_L^*\end{bmatrix}. \tag{9}$$

In such as a case, where the resistance, the inductance, and the permanent magnet flux of the motor 107 are unknown, at first, the permanent magnet flux is determined by operating the motor 107 at no-load condition and then the gain tuning algorithm is executed to learn an optimal feedback control policy and an optimal feedforward control policy.

Figure 4:
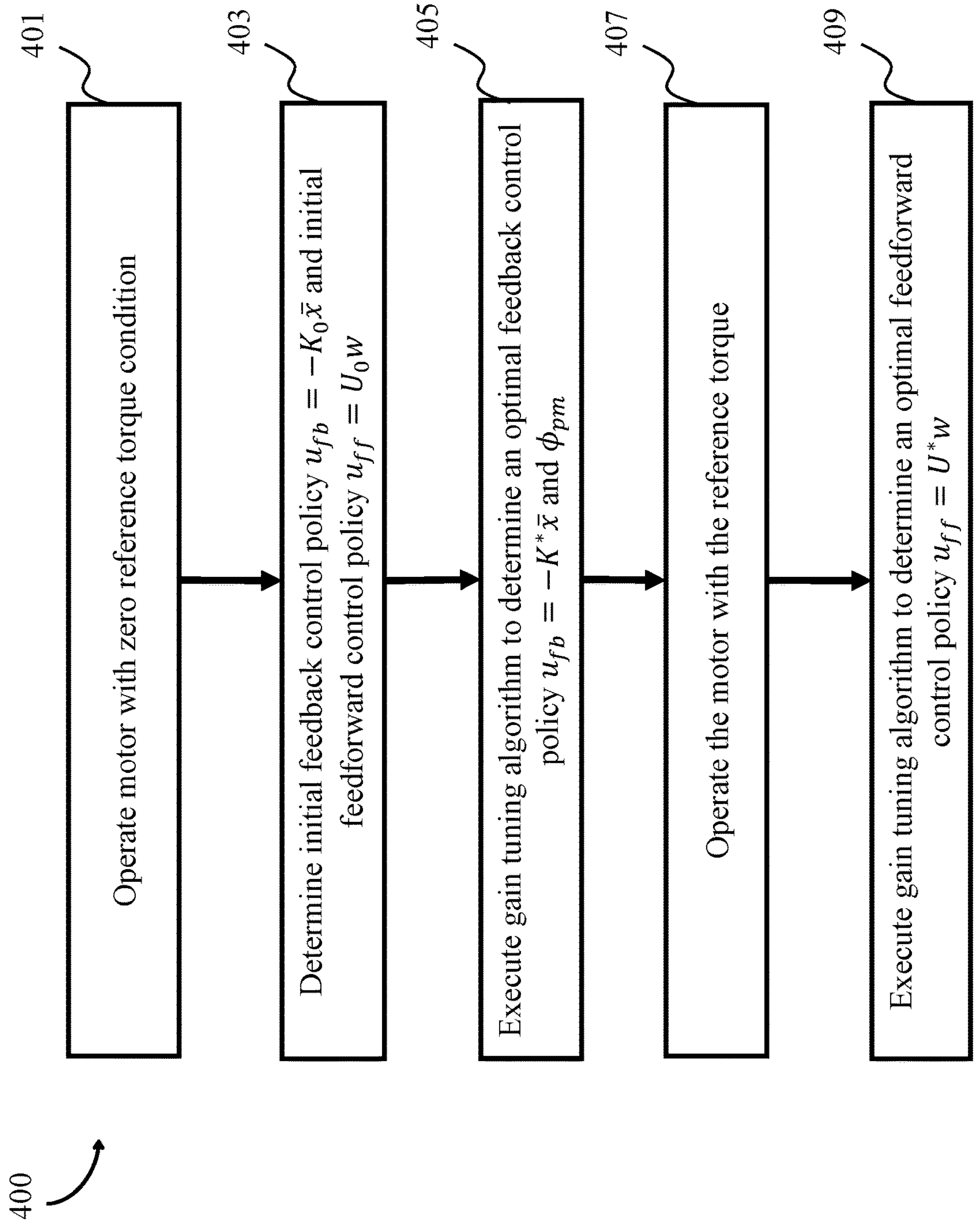
FIG. 4 shows a block diagram of a method for learning an optimal feedback control policy and an optimal feedforward control policy when resistance, inductance and permanent magnet flux of the motor are unknown, according to an embodiment of the present disclosure.

FIG. 4 shows a block diagram of a method 400 for learning the optimal feedback control policy and the optimal feedforward control policy when the resistance, the inductance, and the permanent magnet flux of the motor 107 are unknown, according to an embodiment of the present disclosure. At block 401, the processor 115 operates the motor 107 with zero reference torque, and reformulates the motor model with appropriate system matrices A, B, C, D, F and the pseudo torque reference w. Particularly, as $T_l^*=0$, $\phi_{pm}$ does not appear in F and thus F is known.

At block 403, the processor 115 determines the initial feedback control policy $u_{fb}=-K_0\bar{x}$ and the initial feedforward control policy $u_{ff}=U_0 w$. At block 405, with A, B, D unknown and C, F known, the processor 115 executes the gain tuning algorithm to determine the optimal feedback control policy $u_{fb}=-K^*\bar{x}$ and $\phi_{pm}$. With $\phi_{pm}$ being determined, at block 407, the processor 115 operates the motor 107 at normal condition, i.e., $$T_l^*\neq 0$$

(or at the reference torque), where the motor model can be reformulated to derive appropriate matrices A, B, C, D, F and the pseudo-reference w. Note that because $\phi_{pm}$ has been determined in 405, during 407, the matrix F is known. Further, at block 409, the processor 115 executes the gain tuning algorithm to determine the optimal feedforward control policy $u_{ff}=U^*w$.

Figure 5:
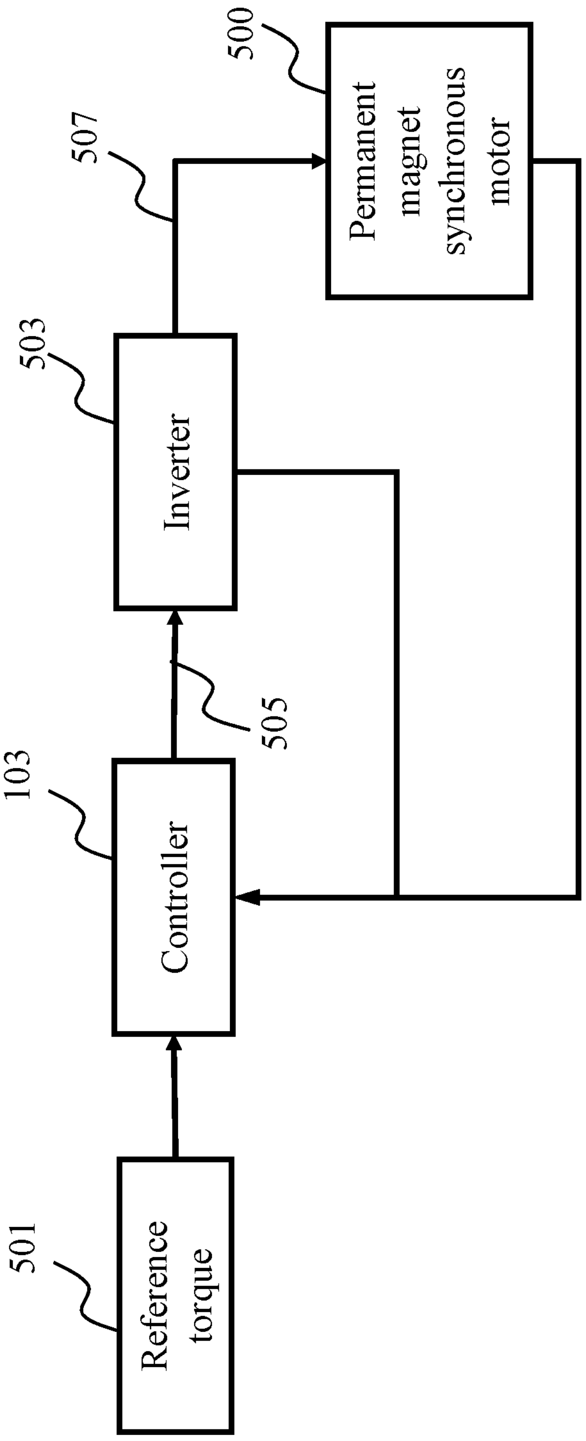
FIG. 5 illustrates controlling of the permanent magnet synchronous motor by the controller, according to an embodiment of the present disclosure.

FIG. 5 illustrates controlling of a permanent magnet synchronous motor 500 by the controller 103, according to an embodiment of the present disclosure. The controller 103 is connected to the permanent magnet synchronous motor 500 via an inverter 503. A reference torque 501 is input to the controller 103. The controller 103 iteratively executes the gain tuning algorithm, until the termination condition is met, to determine the optimal feedback gain and the optimal feedforward gain, as described in FIG. 1C. Further, based on the optimal feedback gain and the optimal feedforward gain, the controller 103 determines a control command 505, as described in FIG. 1D. In an embodiment, the control command 505 indicates desired three-phase balanced sinusoidal voltages. The control command 505 is input to the inverter 503. Based on the control command 505, the inverter 503 outputs three-phase balanced sinusoidal voltages 507 to the permanent magnet synchronous motor 500 to optimally track the reference torque 501.

Figure 6:
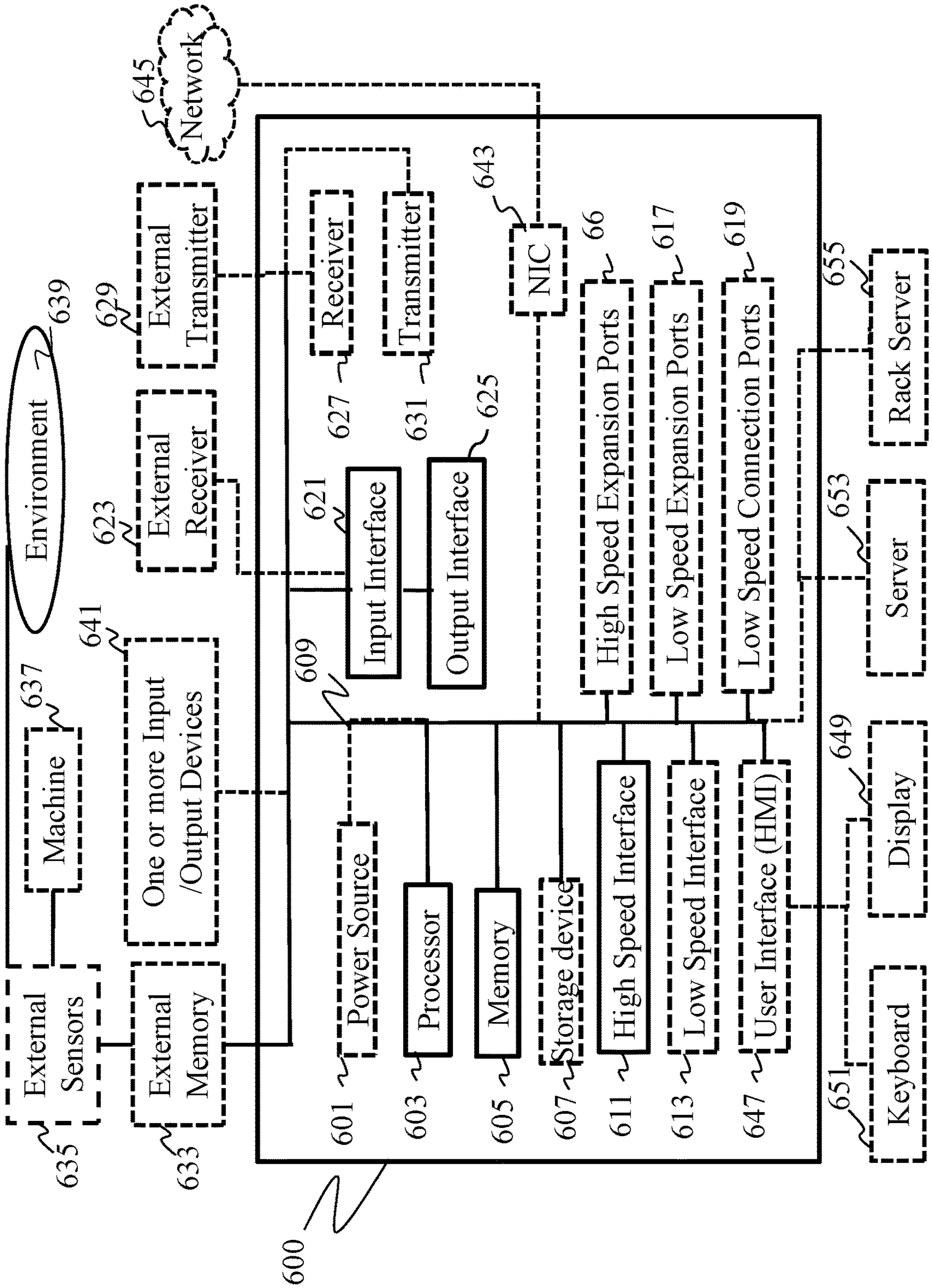
FIG. 6 is a schematic illustrating a computing device for implementing the methods and systems of the present disclosure.

FIG. 6 is a schematic illustrating a computing device 600 for implementing the methods and systems of the present disclosure. The computing device 600 includes a power source 601, a processor 603, a memory 605, a storage device 607, all connected to a bus 609. Further, a high-speed interface 611, a low-speed interface 613, high-speed expansion ports 615 and low speed connection ports 617, can be connected to the bus 609. In addition, a low-speed expansion port 619 is in connection with the bus 609. Further, an input interface 621 can be connected via the bus 609 to an external receiver 623 and an output interface 625. A receiver 627 can be connected to an external transmitter 629 and a transmitter 631 via the bus 609. Also connected to the bus 609 can be an external memory 633, external sensors 635, machine(s) 637, and an environment 639. Further, one or more external input/output devices 641 can be connected to the bus 609. A network interface controller (NIC) 643 can be adapted to connect through the bus 609 to a network 645, wherein data or other data, among other things, can be rendered on a third-party display device, third party imaging device, and/or third-party printing device outside of the computer device 600.

The memory 605 can store instructions that are executable by the computer device 600 and any data that can be utilized by the methods and systems of the present disclosure. The memory 605 can include random access memory (RAM), read only memory (ROM), flash memory, or any other suitable memory systems. The memory 605 can be a volatile memory unit or units, and/or a non-volatile memory unit or units. The memory 605 may also be another form of computer-readable medium, such as a magnetic or optical disk.

The storage device 607 can be adapted to store supplementary data and/or software modules used by the computer device 600. The storage device 607 can include a hard drive, an optical drive, a thumb-drive, an array of drives, or any combinations thereof. Further, the storage device 607 can contain a computer-readable medium, such as a floppy disk device, a hard disk device, an optical disk device, or a tape device, a flash memory or other similar solid-state memory device, or an array of devices, including devices in a storage area network or other configurations. Instructions can be stored in an information carrier. The instructions, when executed by one or more processing devices (for example, the processor 603), perform one or more methods, such as those described above.

The computing device 600 can be linked through the bus 609, optionally, to a display interface or user Interface (HMI) 647 adapted to connect the computing device 600 to a display device 649 and a keyboard 651, wherein the display device 649 can include a computer monitor, camera, television, projector, or mobile device, among others. In some implementations, the computer device 600 may include a printer interface to connect to a printing device, wherein the printing device can include a liquid inkjet printer, solid ink printer, large-scale commercial printer, thermal printer, UV printer, or dye-sublimation printer, among others.

The high-speed interface 611 manages bandwidth-intensive operations for the computing device 600, while the low-speed interface 613 manages lower bandwidth-intensive operations. Such allocation of functions is an example only. In some implementations, the high-speed interface 611 can be coupled to the memory 605, the user interface (HMI) 647, and to the keyboard 651 and the display 649 (e.g., through a graphics processor or accelerator), and to the high-speed expansion ports 66, which may accept various expansion cards via the bus 609.

In an implementation, the low-speed interface 613 is coupled to the storage device 607 and the low-speed expansion ports 617, via the bus 609. The low-speed expansion ports 617, which may include various communication ports (e.g., USB, Bluetooth, Ethernet, wireless Ethernet) may be coupled to the one or more input/output devices 641. The computing device 600 may be connected to a server 653 and a rack server 655. The computing device 600 may be implemented in several different forms. For example, the computing device 600 may be implemented as part of the rack server 655.

The description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments.

Further, embodiments of the present disclosure and the functional operations described in this specification can be implemented in digital electronic circuitry, in tangibly-embodied computer software or firmware, in computer hardware, including the structures disclosed in this specification and their structural equivalents, or in combinations of one or more of them.

Further some embodiments of the present disclosure can be implemented as one or more computer programs, i.e., one or more modules of computer program instructions encoded on a tangible non transitory program carrier for execution by, or to control the operation of, data processing apparatus. Further still, program instructions can be encoded on an artificially generated propagated signal, e.g., a machine-generated electrical, optical, or electromagnetic signal, which is generated to encode information for transmission to suitable receiver apparatus for execution by a data processing apparatus. The computer storage medium can be a machine-readable storage device, a machine-readable storage substrate, a random or serial access memory device, or a combination of one or more of them.

According to embodiments of the present disclosure the term "data processing apparatus" can encompass all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code.

A computer program can be deployed to be executed on one computer or on multiple computers that are located at one site or distributed across multiple sites and interconnected by a communication network. Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data.

Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

The invention claimed is:

1. A controller for controlling a permanent magnet synchronous motor to optimally track a reference torque, the controller comprising: a processor; and a memory having instructions stored thereon that, when executed by the processor, cause the controller to:

reformulate a model of the permanent magnet synchronous motor based on one or more unknown parameters of the model, and the reference torque, wherein the reformulated model includes a pseudo torque reference derived based on the reference torque;

determine an initial feedback control policy and an initial feedforward control policy, based on priori knowledge of parameters of the reformulated model of the permanent magnet synchronous motor;

execute iteratively a gain tuning algorithm, until a termination condition is met, to determine an optimal feedback gain and an optimal feedforward gain, wherein to execute an iteration of the gain tuning algorithm, the processor is configured to:

control the permanent magnet synchronous motor based on a perturbed control input to obtain a first feedback signal, wherein the perturbed control input is based on the initial feedforward control policy, the initial feedback control policy and a perturbation signal;

learn the optimal feedback gain based on the first feedback signal, the pseudo torque reference, and the perturbed control input;

control the permanent magnet synchronous motor based on a control input and a perturbed pseudo torque reference, to obtain a second feedback signal, wherein the control input is based on the initial feedforward control policy and the initial feedback control policy; and wherein the perturbed pseudo torque reference corresponds to the pseudo torque reference perturbed with an additive perturbation signal; and learn the optimal feedforward gain based on the second feedback signal, the perturbed pseudo torque reference, and the control input;

determine a feedback control command and a feedforward control command based on the optimal feedback gain and the optimal feedforward gain, respectively;

determine a control command based on the feedback control command and the feedforward control command; and control the permanent magnet synchronous motor based on the determined control command to optimally track the reference torque.

2. The feedback controller of claim 1, wherein the first feedback signal includes a current and a speed produced by the permanent magnet synchronous motor corresponding to the perturbed control input, and wherein the second feedback signal includes a current and a speed produced by the permanent magnet synchronous motor corresponding to the control input.

3. The feedback controller of claim 1, wherein, to learn the optimal feedback gain based on the first feedback signal, the pseudo torque reference, and the perturbed control input, the processor is further configured to:

formulate a regression equation based on the first feedback signal, the pseudo torque reference, and the perturbed control input; and solve the regression equation to determine the optimal feedback gain.

4. The feedback controller of claim 1, wherein, to learn the optimal feedforward gain based on the second feedback signal, the perturbed pseudo torque reference, and the control input, the processor is further configured to:

formulate a regression equation based on the second feedback signal, the perturbed pseudo torque reference, and the control input; and solve the regression equation to determine the optimal feedforward gain.

5. The feedback controller of claim 1, wherein the one or more unknown parameters of the model includes a resistance of the motor and an inductance of the motor.

6. The feedback controller of claim 1, wherein the one or more unknown parameters of the model includes a resistance of the permanent magnet synchronous motor, an inductance of the permanent magnet synchronous motor, and permanent magnet flux of the permanent magnet synchronous motor.

7. The feedback controller of claim 6, wherein the processor is further configured to:

operate the permanent magnet synchronous motor with zero reference torque;

execute the gain tuning algorithm to determine the permanent magnet flux of the permanent magnet synchronous motor and an optimal feedback control policy;

operate the permanent magnet synchronous motor with the reference torque; and execute the gain tuning algorithm to determine an optimal feedforward control policy.

8. A method for controlling a permanent magnet synchronous motor to optimally track a reference torque, the method comprising:

reformulating a model of the permanent magnet synchronous motor based on one or more unknown parameters of the model, and the reference torque, wherein the reformulated model includes a pseudo torque reference derived based on the reference torque;

determining an initial feedback control policy and an initial feedforward control policy, based on priori knowledge of parameters of the reformulated model of the permanent magnet synchronous motor;

executing iteratively a gain tuning algorithm, until a termination condition is met, to determine an optimal feedback gain and an optimal feedforward gain, wherein an iteration of the gain tuning algorithm comprises:

controlling the permanent magnet synchronous motor based on a perturbed control input to obtain a first feedback signal, wherein the perturbed control input is based on the initial feedforward control policy, the initial feedback control policy and a perturbation signal;

learning the optimal feedback gain based on the first feedback signal, the pseudo torque reference, and the perturbed control input;

controlling the permanent magnet synchronous motor based on a control input and a perturbed pseudo torque reference, to obtain a second feedback signal, wherein the control input is based on the initial feedforward control policy and the initial feedback control policy; and wherein the perturbed pseudo torque reference corresponds to the pseudo torque reference perturbed with an additive perturbation signal; and learning the optimal feedforward gain based on the second feedback signal, the perturbed pseudo torque reference, and the control input;

determining a feedback control command and a feedforward control command based on the optimal feedback gain and the optimal feedforward gain, respectively;

determining a control command based on the feedback control command and the feedforward control command; and controlling the permanent magnet synchronous motor based on the determined control command to optimally track the reference torque.

9. The method of claim 8, wherein the first feedback signal includes a current and a speed produced by the permanent magnet synchronous motor corresponding to the perturbed control input, and wherein the second feedback signal includes a current and a speed produced by the permanent magnet synchronous motor corresponding to the control input.

10. The method of claim 8, wherein, to learn the optimal feedback gain based on the first feedback signal, the pseudo torque reference, and the perturbed control input, the method further comprises:

formulating a regression equation based on the first feedback signal, the pseudo torque reference, and the perturbed control input; and solving the regression equation to determine the optimal feedback gain.

11. The method of claim 8, wherein, to learn the optimal feedforward gain based on the second feedback signal, the perturbed pseudo torque reference, and the control input, the method further comprises:
formulating a regression equation based on the second feedback signal, the perturbed pseudo torque reference, and the control input; and
solving the regression equation to determine the optimal feedforward gain.

12. The method of claim 8, wherein the one or more unknown parameters of the model includes a resistance of the permanent magnet synchronous motor and an inductance of the permanent magnet synchronous motor.

13. The method of claim 8, wherein the one or more unknown parameters of the model includes a resistance of the permanent magnet synchronous motor, an inductance of the permanent magnet synchronous motor, and permanent magnet flux of the permanent magnet synchronous motor.

14. A non-transitory computer-readable storage medium embodied thereon a program executable by a processor for performing a method for controlling a permanent magnet synchronous motor to optimally track a reference torque, the method comprising:
reformulating a model of the permanent magnet synchronous motor based on one or more unknown parameters of the model, and the reference torque, wherein the reformulated model includes a pseudo torque reference derived based on the reference torque;
determining an initial feedback control policy and an initial feedforward control policy, based on priori knowledge of parameters of the reformulated model of the permanent magnet synchronous motor;
executing iteratively a gain tuning algorithm, until a termination condition is met, to determine an optimal feedback gain and an optimal feedforward gain, wherein an iteration of the gain tuning algorithm comprises:
controlling the permanent magnet synchronous motor based on a perturbed control input to obtain a first feedback signal, wherein the perturbed control input is based on the initial feedforward control policy, the initial feedback control policy and a perturbation signal;
learning the optimal feedback gain based on the first feedback signal, the pseudo torque reference, and the perturbed control input;
controlling the permanent magnet synchronous motor based on a control input and a perturbed pseudo torque reference, to obtain a second feedback signal, wherein the control input is based on the initial feedforward control policy and the initial feedback control policy; and wherein the perturbed pseudo torque reference corresponds to the pseudo torque reference perturbed with an additive perturbation signal; and
learning the optimal feedforward gain based on the second feedback signal, the perturbed pseudo torque reference, and the control input;
determining a feedback control command and a feedforward control command based on the optimal feedback gain and the optimal feedforward gain, respectively;
determining a control command based on the feedback control command and the feedforward control command; and
controlling the permanent magnet synchronous motor based on the determined control command to optimally track the reference torque.

15. The non-transitory computer-readable storage medium of claim 14, wherein the first feedback signal includes a current and a speed produced by the permanent magnet synchronous motor corresponding to the perturbed control input, and wherein the second feedback signal includes a current and a speed produced by the permanent magnet synchronous motor corresponding to the control input.

16. The non-transitory computer-readable storage medium of claim 14, wherein, to learn the optimal feedback gain based on the first feedback signal, the pseudo torque reference, and the perturbed control input, the method further comprises:
formulating a regression equation based on the first feedback signal, the pseudo torque reference, and the perturbed control input; and
solving the regression equation to determine the optimal feedback gain.

17. The non-transitory computer-readable storage medium of claim 14, wherein, to learn the optimal feedforward gain based on the second feedback signal, the perturbed pseudo torque reference, and the control input, the method further comprises:
formulating a regression equation based on the second feedback signal, the perturbed pseudo torque reference, and the control input; and
solving the regression equation to determine the optimal feedforward gain.

18. The non-transitory computer-readable storage medium of claim 14, wherein the one or more unknown parameters of the model includes a resistance of the permanent magnet synchronous motor and an inductance of the permanent magnet synchronous motor.

19. The non-transitory computer-readable storage medium of claim 14, wherein the one or more unknown parameters of the model includes a resistance of the permanent magnet synchronous motor, an inductance of the permanent magnet synchronous motor, and permanent magnet flux of the permanent magnet synchronous motor.

20. The non-transitory computer-readable storage medium of claim 19, wherein the method further comprises:
operating the permanent magnet synchronous motor with zero reference torque;
executing the gain tuning algorithm to determine the permanent magnet flux of the permanent magnet synchronous motor and an optimal feedback control policy;
operating the permanent magnet synchronous motor with the reference torque; and
executing the gain tuning algorithm to determine an optimal feedforward control policy.

* * * * *